(12) United States Patent
Liu et al.

(10) Patent No.: US 11,002,304 B2
(45) Date of Patent: May 11, 2021

(54) BICYCLE AND CRANK ASSEMBLY THEREOF

(71) Applicant: Ningbo Tekmax Bicycle Co., Ltd, Ningbo (CN)

(72) Inventors: Peng Liu, Cixi (CN); Xiaofei Zhao, Cixi (CN); Xinfa Wu, Ningbo (CN)

(73) Assignee: Ningbo Tekmax Bicycle Co., Ltd, Ningbo (CN)

( * ) Notice: Subject to any disclaimer, the term of this patent is extended or adjusted under 35 U.S.C. 154(b) by 518 days.

(21) Appl. No.: 16/115,684

(22) Filed: Aug. 29, 2018

(65) Prior Publication Data

US 2020/0072267 A1 Mar. 5, 2020

(51) Int. Cl.
*B62M 3/00* (2006.01)
*F16B 7/04* (2006.01)
*B62M 1/36* (2013.01)

(52) U.S. Cl.
CPC ............... *F16B 7/042* (2013.01); *B62M 1/36* (2013.01); *B62M 3/00* (2013.01)

(58) Field of Classification Search
CPC .......... B62M 1/36; B62M 3/00; B62M 3/003; B62M 3/02; B62M 3/04; B62M 2003/006; B62K 2015/003; F16B 7/042; F16B 7/0433; F16B 7/0413; F16B 7/0406
See application file for complete search history.

(56) References Cited

U.S. PATENT DOCUMENTS

| 3,422,701 | A * | 1/1969 | Boisis | B62M 3/08 |
| | | | | 74/594.7 |
| 2004/0007089 | A1* | 1/2004 | Fan | B62K 15/00 |
| | | | | 74/594.1 |
| 2017/0233035 | A1* | 8/2017 | Tong | B62M 3/08 |
| | | | | 74/594.1 |
| 2020/0148302 | A1* | 5/2020 | Gatto | B62M 3/08 |

FOREIGN PATENT DOCUMENTS

| CN | 207843206 | * | 9/2018 | ............. B62M 3/08 |
| CN | 209956171 | * | 1/2020 | ............. B62M 3/08 |

OTHER PUBLICATIONS

Machine Translation of CN 209956171, obtained Mar. 17, 2021.*
Machine Translation of CN 207843206, obtained Mar. 16, 2021.*

* cited by examiner

*Primary Examiner* — Richard W Ridley
*Assistant Examiner* — Brian J McGovern
(74) *Attorney, Agent, or Firm* — Bay State IP, LLC

(57) ABSTRACT

The present application relates to the field of bicycle manufacturing technology, and in particular to a bicycle and a crank assembly thereof, comprising a first handle and a second handle, wherein one of the handles is connected to a transmission shaft and the other of the handles is connected to a pedal, the first handle and the second handle are rotatably connected, and the axis of rotation coincides with the extending direction of the crank; and further comprising a locking mechanism, wherein the first handle is rotatable with respect to the second handle when the locking mecha- (Continued)

nism is in the first state, and the locking mechanism limits the relative rotation of the first handle and the second handle when the locking mechanism is in the second state.

13 Claims, 3 Drawing Sheets

BICYCLE AND CRANK ASSEMBLY THEREOF

TECHNICAL FIELD

The present application relates to the field of bicycle manufacturing technology, and in particular to a bicycle and a crank assembly thereof.

BACKGROUND

The crank assembly of the bicycle is a mechanism for connecting the pedal and the crankset, and transmits the kinetic energy of the pedal to the crankset through the transmission shaft, and then transmits the kinetic energy to the driving wheel of the bicycle through the chain on the crankset, so as to realize the rotation of the driving wheel of the bicycle.

In the prior art, after being assembled, the pedal on the crank assembly of the bicycle is generally fixedly connected to the crank assembly, and the whole body cannot be folded. Due to the protruding body structure of the pedal, most of the finished bicycles are assembled by 85% during transportation, that is, the front wheel and the handlebar are disassembled and packaged, and the pedal is assembled by the store or the consumer. Thus, it is easy to have problems such as missing pedals, poor fit between the pedal and the denticulate hinge of the crank. It is very difficult to assemble, and additional configuration assembly tools are required. Another way is to deliver after the pedal is assembled. In this way, the pedal can easily collide with external objects and cause damage, and the space where the pedal protrudes can also cause a waste of the packaging box space, resulting in an excessive volume of the packaging box. In turn, the transportation cost is increased.

Therefore, how to solve the problem that the pedal position of the bicycle protrudes, the assembly is difficult when being packaged separately, the footprint is large during the whole packaging, and the transportation cost is high is a key technical problem to be solved by those skilled in the art.

SUMMARY

In order to overcome the problems in the related art at least to some extent, the purpose of the present application is to provide a bicycle and a crank assembly thereof, which can solve the problems that the pedal position of the bicycle protrudes, it is difficult to assemble when packaging separately, the footprint is large in the overall packaging, and the transportation cost is high.

The present application provides a crank assembly for a bicycle comprising a transmission shaft and two cranks at two ends of the transmission shaft, wherein the crank comprises:

a first handle and a second handle, wherein one of the handles is connected to a transmission shaft and the other of the handles is connected to a pedal, the first handle and the second handle are rotatably connected, and the axis of rotation coincides with the extending direction of the crank; and a locking mechanism, wherein the first handle is rotatable with respect to the second handle when the locking mechanism is in the first state, and the locking mechanism limits the relative rotation of the first handle and the second handle when the locking mechanism is in the second state.

Preferably, the locking mechanism is connected to the first handle and the locking mechanism is fixed to the first handle circumferentially and movable in the axial direction of the first handle; the locking mechanism is locked to the second handle circumferentially when moving in the axial direction of the first handle to the first position, and the locking mechanism releases the circumferential locking to the second handle when moving in the axial direction of the first handle to the second position.

Preferably, the first handle is provided with a blind hole, the opening direction of the blind hole is the same as the extending direction of the first handle, and the end of the second handle projects into and is connected within the blind hole.

Preferably, the locking mechanism comprises a slider having a sliding pin, the slider is located within the blind hore and is slidable in the axial direction of the blind hole, the side wall of the blind hole is provided with a strip-shaped hole penetrating in the dimension direction thereof, the strip-shaped hole extends in the axial direction of the blind hole, the sliding pin is provided in the strip-shaped hole, the strip-shaped hole limits the circumferential rotation of the sliding pin, and the sliding pin is slidable in the extending direction of the strip-shaped hole; when the sliding pin is at the first end of the strip-shaped hole, the slider abuts against and is circumferentially locked to the second handle, and when the sliding pin is located at the second end of the strip-shaped hole, the slider is separated from the second handle.

Preferably, the locking mechanism further comprises an elastic member, the slider abuts against and is circumferentially locked to the second handle under the action of the elastic member; when the slider is stressed away from the second handle, the elastic member is deformed, and when the stress of the slider disappears, the elastic member is restored from deformation and drives the slider to be close to the second handle.

Preferably, the second handle is connected to the first handle by a threaded fit.

Preferably, one of the slider and the second handle is provided with a block, and the other thereof is provided with a neck into which the block is embedded, wherein the neck is capable of limiting the rotation of the block with respect to the neck.

Preferably, the neck comprises a first neck and a second neck perpendicular to the first neck, and the extending direction of the first neck is the same as the extending direction of the axis of rotation of the pedal.

Preferably, the depth of the first neck is greater than the depth of the second neck.

Preferably, the block comprises a first block and a second block perpendicular to the first block, and the extending direction of the first block is the same as the extending direction of the pedal.

Preferably, the locking structure further comprises a sliding sleeve that is in clearance engagement with the first handle, and the end of the sliding pin is fixedly connected to the sliding sleeve.

Preferably, two strip-shaped holes are oppositely provided, the slide pin is provided so that the slider radially penetrates through a pin, and the two ends of the pin are located in the two strip-shaped holes, respectively.

Preferably, the elastic member is provided as a spring between the slider and the bottom of the blind hole, and one end of the slider close to the spring is provided with a groove into which the end of the spring is embedded.

The present application further provides a bicycle comprising a crank assembly, wherein the crank assembly is the crank assembly according to any of the above.

The technical solutions provided by the present application may comprise the following beneficial effects.

1. The crank assembly can fold the pedal in the direction of the transmission shaft, and the folded pedal can reduce the dimension of the packaging carton and reduce the cost of the carton, thereby reducing the packaging cost of the whole bicycle.

2. The packaged bicycle has a small footprint, which increases the number of loading and reduces the transportation cost.

3. When the bicycle is unpacked and used, the assembly can be completed only by rotating the folded pedal to be reset without special tools, and the assembly is simple, saving time and labor.

4. The footprint of the bicycle can be reduced when being carried out.

It is to be understood that the above general description and the following detailed description are merely exemplary and explanatory and are not intended to be limiting the present application.

BRIEF DESCRIPTION OF THE DRAWINGS

The drawings herein are incorporated in and constitute a part of the specification, illustrate embodiments consistent with the present application and serve to explain the principles of the present application in conjunction with the specification.

In order to more clearly illustrate the embodiments of the present invention or the technical solutions in the prior art, the drawings used in the embodiments or the description of the prior art will be briefly described below. It is apparent that the drawings in the following description are only a part of the embodiments of the present invention. Those skilled in the art may obtain other drawings from these drawings without any creative efforts.

Figure 1:
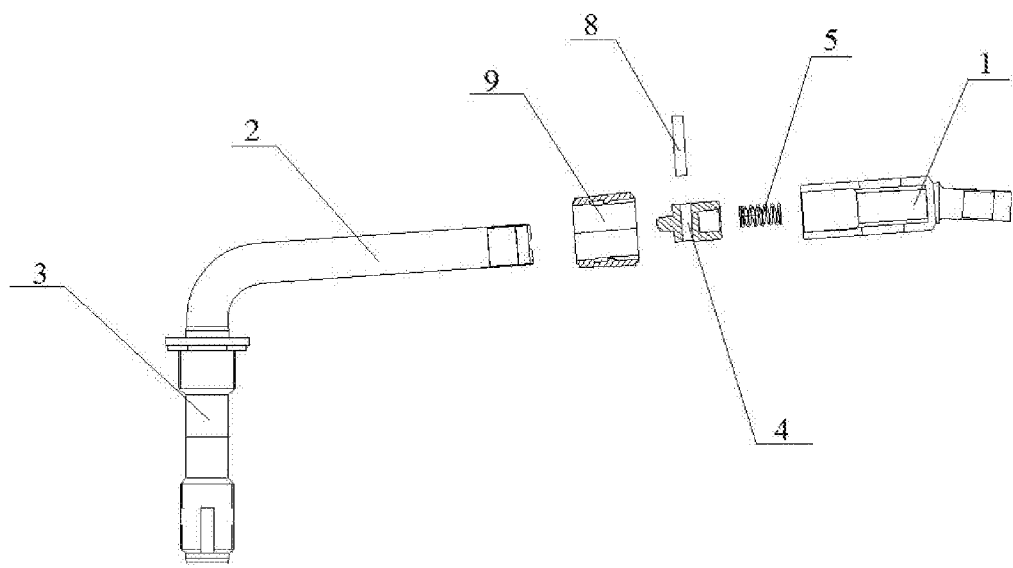
FIG. 1 is an exploded diagram illustrating a crank according to some exemplary embodiments.
Figure 2:
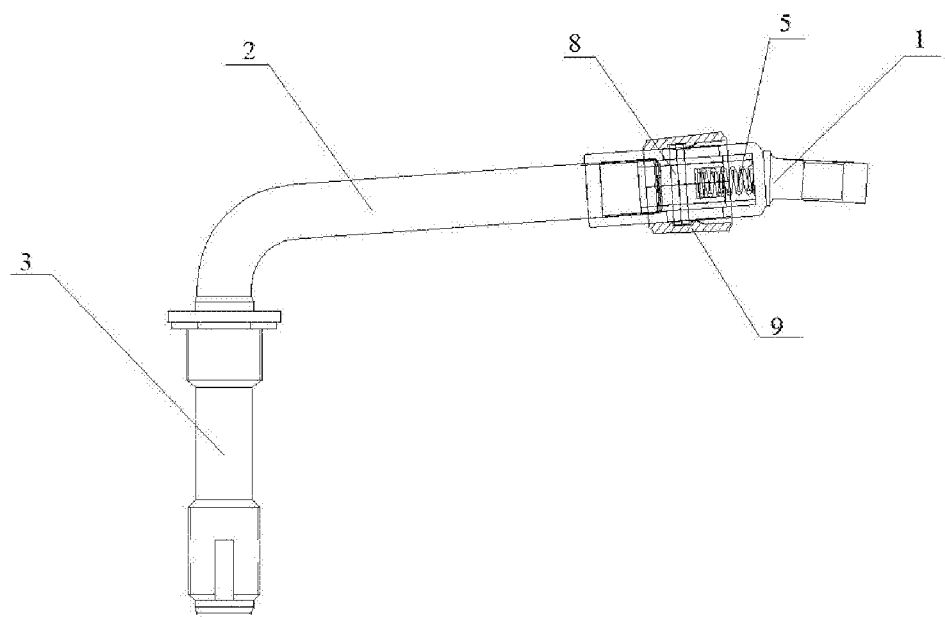
FIG. 2 is a diagram illustrating the structure of a crank according to some exemplary embodiments.

In the figures: 1—a first handle, 2—a second handle, 3—a transmission shaft, 4—a slider, 5—an elastic member, 6—a neck, 7—a strip-shaped hole, 8—a pin, 9—a sliding sleeve.

DESCRIPTION OF THE EMBODIMENTS

Exemplary embodiments will be described in detail herein, examples of which are illustrated in the accompanying drawings. The same numbers in different drawings indicate the same or similar elements when the following description refers to drawings, unless otherwise indicated. The embodiments described in the following exemplary embodiments do not represent all embodiments consistent with the present application. Instead, they are merely examples of devices or methods consistent with some aspects of the present application as detailed in the appended claims.

The specific embodiment provides a bicycle and a crank assembly thereof. When the bicycle needs to be packaged, the pedal is rotated with the extending direction of the crank as the axis of rotation so that the pedal is folded in the direction of the transmission shaft, thereby saving the footprint of the pedal and reducing the packaging cost. Moreover, the rotatable structure of the crank may reduce the number of times the pedal is assembled and disassembled, avoiding the problem that the pedal is lost and the denticulate hinge is poor in fit due to a plurality times of disassembly and assembly.

In order to make the objects, technical solutions and advantages of the present invention more clear, the technical solutions of the present invention will be described in detail below. It is apparent that the described embodiments are only a part of the embodiments of the present invention, rather than all of the embodiments. All other embodiments obtained by those skilled in the art based on the embodiments of the present invention without any creative efforts fall within the scope of the present invention.

Hereinafter, embodiments will be described with reference to the drawings. Furthermore, the embodiments shown below do not limit the present invention as set forth in the claims. Further, the entire contents of the configurations represented in the following embodiments are not necessarily limited to the solutions of the present invention as set forth in the claims.

Referring to FIG. 1 to FIG. 6, the present embodiment provides a crank assembly for a bicycle comprising a transmission shaft 3 and two cranks at two ends of the transmission shaft 3. The two cranks are rotated about the axis of the transmission shaft so that the transmission shaft rotates, which in turn drives the driving wheel to rotate. In some embodiments, the transmission shaft 3 and the two cranks may be of unitary structure.

The crank comprises a first handle portion 1, a second handle portion 2, and a locking mechanism. The first handle 1 is connected to the second handle 2, where the extending directions of the first handle 1 and the second handle 2 are the same, both of which are the extending direction of the crank; moreover, the first handle 1 is rotatable with respect to the second handle 2, and the axis of rotation coincides with the extending direction of the crank. The ends of the first handle 1 and the second handle 2 may be connected, and the first handle 1 is rotatable about its central axis, so that when the first handle 1 or the second handle 2 is rotated, the pedal can be rotated therewith, thereby achieving folding.

It should be noted that the extending direction of the crank is the direction in which the crank extends in the lengthwise direction thereof, and may be the same as the direction of the central axis of the crank.

One of the first handle 1 and the second handle 2 is connected to the transmission shaft 3 and the other is connected to the pedal, so that since the first handle 1 is connected to the second handle 2, the kinetic energy of the pedal can be transmitted to the transmission shaft 3, thereby realizing the rotation of the transmission shaft 3.

The locking mechanism may be connected to the first handle 1, or may be connected to both first handle 1 and the second handle 2. Here preferably, the locking mechanism is slidably connected within the first handle 1. When the locking mechanism is in the first state, that is, in the unlocked state, the first handle 1 and the second handle 2 are relatively rotatable; when the locking mechanism is in the second state, that is, in the locked state, the locking mechanism will limit the relative rotation of the first handle 1 and the second handle 2. Thus, when the pedal needs to be folded, the folding of the pedal can be realized only by controlling the lock mechanism to be in the unlocked state so that the first handle 1 and the second handle 2 are relatively rotated. When the pedal needs not to be folded, the locking mechanism is adjusted to the locked state, and the first handle 1 and the second handle 2 cannot be relatively rotated, thereby fixing the pedal.

In this way, the crank assembly can fold the pedal in the direction of the transmission shaft 3, and the folded pedal can reduce the dimension of the packaging carton and reduce the cost of the carton, thereby reducing the packaging cost of the whole bicycle. Moreover, the packaged bicycle has a small footprint, which increases the number of loading and reduces the transportation cost; when the bicycle is unpacked and used, the assembly can be completed only by rotating the folded pedal to be reset without special tools, and the assembly is simple, saving time and labor; the footprint of the bicycle can be reduced when being carried out.

Further, the locking mechanism is connected to the first handle 1. Here preferably, the locking mechanism is slidably connected within the first handle 1. The locking mechanism is fixed to the first handle 1 circumferentially, where "circumferentially fixed" means that the locking mechanism is not rotatable in the outer circumferential direction of the first handle 1; moreover, the locking mechanism is rotatable in the axial direction of the first handle 1, that is, the locking mechanism is displaceable in the extending direction of the first handle 1. When the locking mechanism is moved to the first position, the locking mechanism is fixed to the second handle 2 circumferentially, that is, the locking mechanism and the second handle 2 are not relatively rotatable, and the pedal is in the fixed state at this time; when the locking mechanism is moved to the second position, the circumferential locking between the locking mechanism and the second handle 2 is released, so that the locking mechanism and the second handle 2 are relatively rotatable, and the pedal can be rotated at this time to achieve folding. In this way, the locking mechanism is simple in structure, convenient to operate, and is conducive to improving the stability of the structure.

It should be noted that the "axial direction" and the "circumferential direction" herein do not limit the first handle 1 and the second handle 2 as a cylindrical structure, wherein the first handle 1 and the second handle 2 may be shaped as a square strip or as an oblate strip. Of course, it may be a cylindrical shape, as appropriate. Here preferably, the first handle 1 and the second handle 2 have a cylindrical structure.

Figure 3:
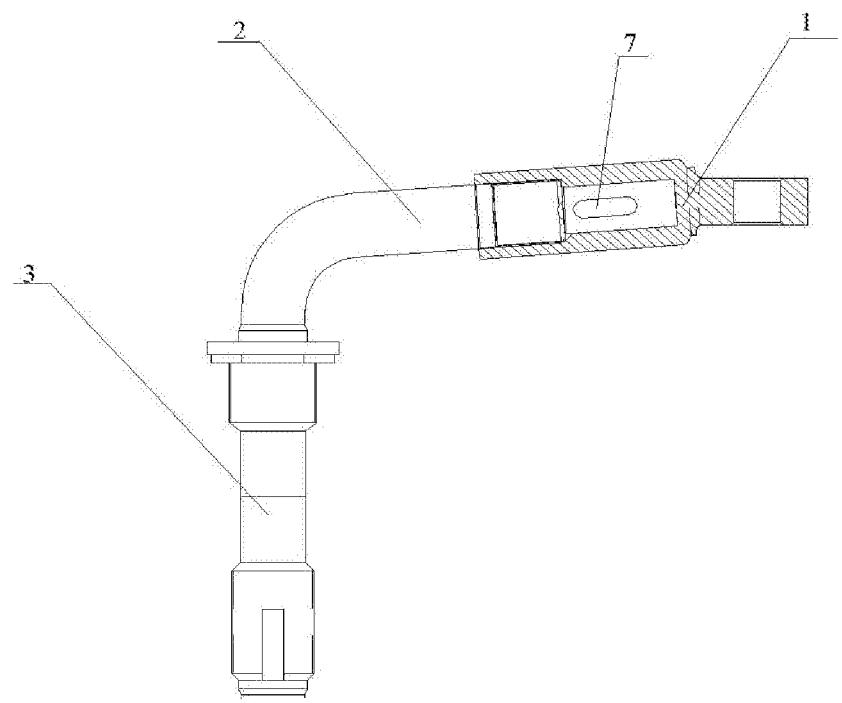
FIG. 3 is a diagram illustrating the connection between a first handle and a second handle according to some exemplary embodiments.

In this embodiment, as shown in FIG. 3, the first handle 1 is provided with a blind hole provided at an end close to the second handle 2, and the opening faces the second handle 2, that is, the opening direction of the blind hole is the same as the extending direction of the first handle 1. Here the extending direction of the first handle 1 may be the direction of the axis of rotation in which the first handle 1 rotates with respect to the second handle 2. Moreover, the end of the second handle 2 projects into and is connected within the blind hole. Thus, the connection structure of the first handle 1 and the second handle 2 is an embedded connection, and the connection surface is relatively large, which is conducive to improving the structural stability of the crank.

Figure 5:
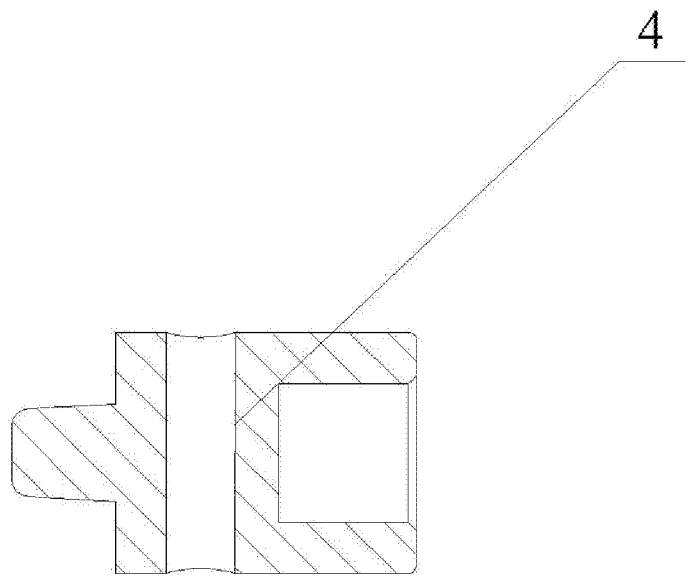
FIG. 5 is a diagram illustrating the structure of a slider according to some exemplary embodiments.

Specifically, the locking mechanism comprises a slider 4, the slider 4 is located within the blind bore and is slidable in the axial direction of the blind hole; the side wall of the blind hole is provided with a strip-shaped elongated hole 7 penetrating in the dimension direction thereof, that is, the blind hole are penetrated internally and externally, and the strip-shaped hole 7 extends in the axial direction of the blind hole; the slider 4 is provided with a sliding pin which is provided in the strip-shaped hole 7, and under the limit of the strip-shaped hole 7, the sliding pin is limited in the circumferential direction of the blind hole and is movable in the extending direction of the strip-shaped hole 7. In this way, when the sliding pin is at the first end of the strip-shaped hole 7, the slider 4 abuts against and is circumferentially locked to the second handle 2, that is, the slider 4 and the second handle 2 are not relatively rotatable; and when the sliding pin is located at the second end of the second handle 2, the slider 4 is separated from the second handle 2, that is, the slider 4 and the second handle 2 are relatively rotatable. In this way, the locking state of the locking mechanism can be controlled by adjusting the position of the sliding pin, which is simple in structure, easy to operate, and conducive to improving the working efficiency. The structure of the slider 4 can be as shown in FIG. 5.

Here, the "axial direction" and the "circumferential direction" of the blind hole do not limit the shape of the blind hole. The axial direction of the blind hole only represents the extending direction of the blind hole, and the circumferential direction of the blind hole is the direction surrounding the outer circumference of the blind hole.

Further, the locking mechanism further comprises an elastic member 5 which is configured to control the slider 4 to be reset. The slider 4 abuts against and is circumferentially locked to the second handle 2 under the action of the elastic member 5. When the slider 4 is stressed away from the second handle 2, the elastic member 5 is deformed and accumulates; and when the stress of the slider 4 disappears, the elastic member 5 is restored from deformation and drives the slider 4 to be close to the second handle 2 until the slider 4 abuts against the second handle 2. In this way, under the action of the elastic member 5, the locking mechanism is always in the locked state, so that the first handle 1 and the second handle 2 are not relative rotatable. In this way, it is not only conducive to more stably fixing the pedal, but also conducive to improving the tightness and stability of the crank.

The first handle 1 and the second handle 2 are connected by a thread. An internal thread may be provided in the blind hole, and an external thread may be provided at an end of the second handle 2. The external thread is fit and connected with the internal thread so that the end of the second handle 2 is screwed into the blind hole. In this way, the stability of the connection of the first handle 1 and the second handle 2 is further improved. In this way, it is conducive to protecting the structure in the blind hole.

In this embodiment, one of the slider 4 and the second handle 2 is provided with a block protrusion, and the other thereof is provided with a neck recess 6. Here, the neck 6 is not only capable of embedding the block, but also limiting the rotation of the block. Since the block is limited in the neck 6 and is not rotatable with respect to the neck 6, the slider 4 and the second handle 2 do not have relative rotation. Thus, the slider 4 and the second handle 2 are connected stably and fit tightly, which is conducive to improving the reliability of the structure. In some embodiments, the neck 6 and the block both extend in the radial direction of the second handle 2. When the pedal needs to be folded, the neck 6 or the block is rotated by 180°, so that the pedal is rotated by 180° towards one side of the transmission shaft 3 to realize the folding of the pedal. Of course, in other embodiments, the block and the slot 6 may also be of a square prism structure.

Figure 4:
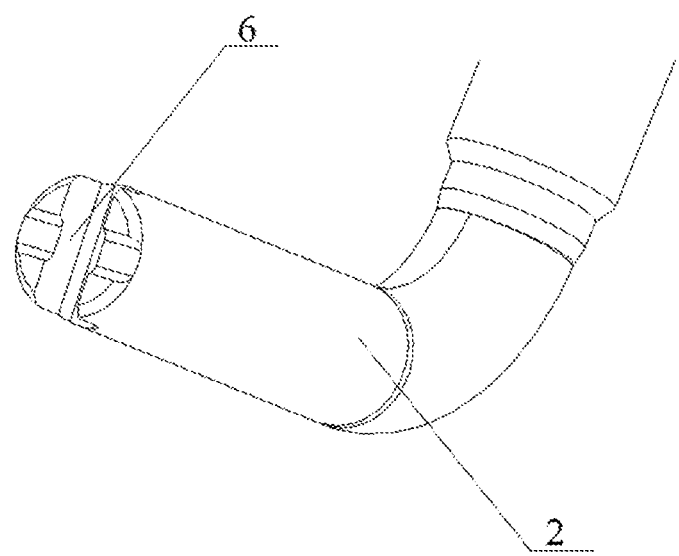
FIG. 4 is a perspective diagram illustrating a second handle according to some exemplary embodiments.

As shown in FIG. 4, the neck 6 comprises a first neck and a second neck. The first neck is perpendicular to the extending direction of the second neck, and the first neck intersects with the second neck at the center of rotation of the slider 4 or the second handle 2, wherein the extending direction of the first neck is the same as the extending direction of the axis of rotation of the pedal. In this way, when the pedal needs to be folded, the block may be rotated from the first neck to the second neck, that is, the block is rotated by 90°, and the pedal is also rotated by 90°, so that the plane where the pedal is located and the plane where the bicycle is located are parallel, which in turn reduces the footprint of the pedal, reduces the packaging volume, and saves packaging and transportation cost.

Further, the depth of the first neck is greater than the depth of the second neck. When the block is located in the first neck, the pedal is in the fixed state. When the block is located in the second neck, the pedal is in the folded state. In this way, it not only makes the fixed state of the pedal more stable, but also facilitates the resetting of the folded pedal.

In other embodiments, the block comprises a first block and a second block. The first block is perpendicular to the extending direction of the second block, and the first block intersects with the second block at the center of rotation of the slider 4 or the second handle 2, wherein the extending direction of the first block is the same as the extending direction of the axis of rotation of the pedal. In this way, when the pedal needs to be folded, the neck 6 may be rotated from the first block to the second block, that is, the neck 6 is rotated by 90°, and the pedal is also rotated by 90°, so that the plane where the pedal is located and the plane where the bicycle is located are parallel, which in turn reduces the footprint of the pedal, reduces the packaging volume, and saves packaging and transportation cost.

Figure 6:
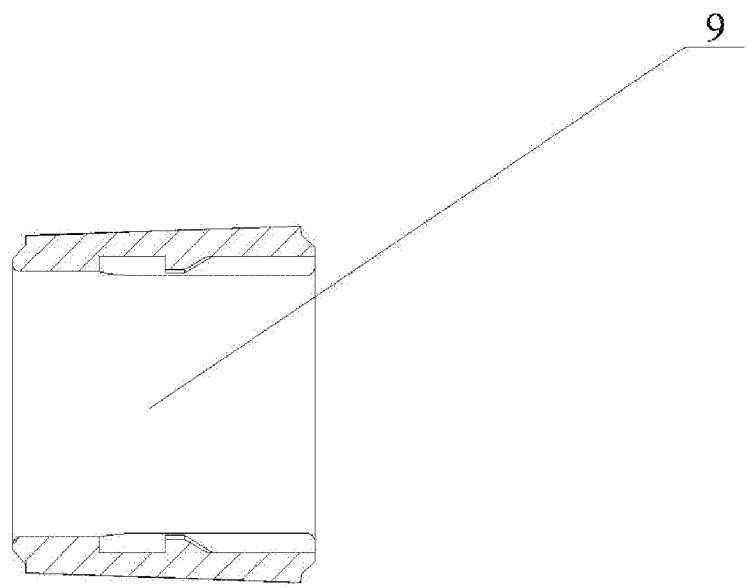
FIG. 6 is diagram illustrating the structure of a sliding sleeve according to some exemplary embodiments.

In this embodiment, the locking mechanism further comprises a sliding sleeve 9 which is sleeved outside the first handle 1 and is in clearance engagement with the first handle 1 so that the sliding sleeve 9 is slidable in the axial direction of the first handle 1; the end of the sliding pin is fixedly connected to the sliding sleeve 9, sliding the sliding sleeve 9, and driving the sliding pin to slide, thereby controlling the locking state of the locking mechanism. In this way, the sliding sleeve 9 is conducive to sliding the sliding pin and displacing the slider 4, and is capable of protecting the structure of the sliding pin. The structure of the sliding sleeve 9 may be as shown in FIG. 6, and the inner side wall of the sliding sleeve 9 is provided with a recess in which the sliding pin is inserted. Preferably, the sliding sleeve 9 can be provided as a plastic sleeve, so that the cost can be saved, the friction coefficient of the outer side wall can be increased, and the force can be easily applied.

In some embodiments, the strip-shaped holes 7 are oppositely provided, the slide pin is provided so that the slider 4 radially penetrates through a pin 8, and the two ends of the pin 8 are located in the two strip-shaped holes 7, respectively. In this way, when sliding the pin 8, the force is applied simultaneously at two ends of the pin 8, which is convenient to apply the force and is conducive to the stability of the locking mechanism.

The elastic member 5 is provided as a spring, which is located between the slider 4 and the bottom of the blind hole, and one side of the slider 4 connected to the spring is provided with a groove into which the spring is embedded and connected. In this way, one end of the spring is limited in the groove, which can prevent the spring from running off and improve the tightness of the connection between the slider 4 and the spring.

The present application further provides a bicycle comprising a crank assembly, wherein the crank assembly is the crank assembly as described in the above embodiments. In this way, the crank assembly can fold the pedal in the direction of the transmission shaft 3, and the folded pedal can reduce the dimension of the packaging carton and reduce the cost of the carton, thereby reducing the packaging cost of the whole bicycle. Moreover, the packaged bicycle has a small footprint, which increases the number of loading and reduces the transportation cost; when the bicycle is unpacked and used, the assembly can be completed only by rotating the folded pedal to be reset without special tools, and the assembly is simple, saving time and labor; the footprint of the bicycle can be reduced when being carried out. The derivation of this beneficial effect is substantially similar to the derivation process of the crank assembly described above, and therefore will not be described again.

A bicycle generally refers to a vehicle having a pedal, and may be a bicycle, an electric vehicle having a pedal, or a toy vehicle having a pedal.

It should be noted that the terms "first", "second" etc., as used herein, are not intended to limit the specific order, but merely to distinguish each component or function.

The above is only the specific embodiment of the present invention, but the scope of the present invention is not limited thereto. Any changes or substitutions conceivable to those skilled in the art should fall within the scope of protection of the present invention. Therefore, the scope of protection of the present invention should be subject to the scope of protection of the claims.

It is to be understood that the same or similar parts in each of the above embodiments may be referred to each other, and those not described in detail in some embodiments may refer to the same or similar content in other embodiments.

While the embodiments of the present application have been shown and described above, it is to be understood that the foregoing embodiments are illustrative and are not to be construed as limiting the present application. Variations, modifications, substitutions and variations of the above embodiments may be made by those skilled in the art within the scope of the present application.

What is claimed is:

1. A foldable bicycle crank assembly, comprising:
   a crank arm including a first portion threadably engaged with a second portion;
   a slider disposed within the first portion and biased towards the second portion;
   wherein the slider is configured to move between a locked state in which the slider engages the second portion to prevent relative rotation between the first portion and the second portion and an unlocked state in which the slider is separated from the second portion which allows relative rotation between the first portion and the second portion;
   wherein relative rotation between the first portion and the second portion allows the foldable bicycle crank assembly to move between an operation state and a folded state.

2. The foldable bicycle crank assembly according to claim 1, wherein the second portion is connected to a transmission shaft on an end of the second portion.

3. The foldable bicycle crank assembly according to claim 1, wherein the first portion is provided with a blind hole, an end of the second portion projects into and is threadably connected with the blind hole.

4. The foldable bicycle crank assembly according to claim 3, further comprising:
   at least one elongated hole formed into a side wall of the first portion and extending along an axial axis of the blind hole;
   the slider includes a sliding pin, the sliding pin is configured to extend into the at least one elongated hole;
   the slider is located within the blind hole and is slidable along the axial axis of the blind hole;
   when the sliding pin is at a first end of the at least one elongated hole, the slider abuts against the second portion, and when the sliding pin is located at a second end of the at least one elongated hole, the slider is separated from the second portion.

5. The foldable bicycle crank assembly according to claim 4, wherein the slider is biased towards the second portion by an elastic member.

6. The foldable bicycle crank assembly according to claim 5, wherein the elastic member is a coil spring.

7. The foldable bicycle crank assembly according to claim 6, further comprising: the first portion includes a groove disposed adjacent to the blind hole, an end of the coil spring is disposed within the groove.

8. The foldable bicycle crank assembly according to claim 4, wherein one of the slider and the second portion is provided with a protrusion and the other of the slider and the second portion is provided with a recess, the protrusion is configured to engage into the recess which prevents relative rotation between the protrusion and recess.

9. The foldable bicycle crank assembly according to claim 8, wherein the protrusion comprises a first protrusion and a second protrusion perpendicular to the first protrusion.

10. The foldable bicycle crank assembly according to claim 9, wherein an axial depth of the first protrusion is greater than an axial depth of the second protrusion.

11. The foldable bicycle crank assembly according to claim 8, wherein the recess includes a first recess and a second recess perpendicular to the first recess.

12. The foldable bicycle crank assembly according to claim 4, further comprising: a sliding sleeve receiving the first portion therein, and an end of the sliding pin is fixedly connected to the sliding sleeve.

13. The foldable bicycle crank assembly according to claim 4, wherein the at least one elongated hole comprises two, oppositely disposed elongated holes, and opposed ends of the sliding pin are disposed within the two, oppositely disposed elongated holes, respectively.

* * * * *